United States Patent [19]

Yamaguchi et al.

[11] Patent Number: 4,952,648

[45] Date of Patent: Aug. 28, 1990

[54] PRODUCTION PROCESS OF MULTIVALENT METAL-MODIFIED SALICYLIC ACID/STYRENE RESIN, COLOR-DEVELOPING AGENT USING THE RESIN AND SUITED FOR USE IN PRESSURE-SENSITIVE COPYING PAPER SHEET AND PRESSURE-SENSITIVE COPYING PAPER UNIT EMPLOYING THE AGENT

[75] Inventors: Keizaburo Yamaguchi, Kawasaki; Yoshimitsu Tanabe, Yokohama; Akihiro Yamaguchi, Kamakura, all of Japan

[73] Assignee: Mitsui Toatsu Chemicals, Incorporated, Tokyo, Japan

[21] Appl. No.: 228,235

[22] Filed: Aug. 4, 1988

[30] Foreign Application Priority Data

Aug. 14, 1987 [JP] Japan .................................. 62-201831

[51] Int. Cl.$^5$ .............................................. C08G 83/00
[52] U.S. Cl. ...................................... 525/539; 503/210; 503/211; 503/212; 503/216; 528/205; 528/206; 528/392
[58] Field of Search ................ 525/539; 528/392, 205, 528/206

[56] References Cited

U.S. PATENT DOCUMENTS

| | | | |
|---|---|---|---|
| 2,119,520 | 6/1938 | Brokering | 85/5 |
| 3,924,027 | 12/1975 | Saito et al. | 427/147 |
| 4,046,941 | 9/1977 | Saito et al. | 428/323 |
| 4,134,847 | 1/1979 | Oda et al. | 252/62.1 |
| 4,173,684 | 11/1979 | Stolfo | 428/531 |
| 4,269,893 | 5/1981 | Kato et al. | 428/341 |
| 4,379,897 | 4/1983 | Asano et al. | 525/506 |
| 4,400,492 | 8/1983 | Asano et al. | 525/506 |
| 4,704,379 | 11/1987 | Shioi et al. | 503/311 |
| 4,748,259 | 5/1988 | Nachbur | 556/132 |

FOREIGN PATENT DOCUMENTS

| | | |
|---|---|---|
| 0186516 | 7/1986 | European Pat. Off. . |
| 0283924 | 3/1988 | European Pat. Off. . |
| 15111 | 5/1972 | Japan . |
| 1571487 | 7/1980 | United Kingdom . |

*Primary Examiner*—Harold D. Anderson
*Attorney, Agent, or Firm*—Fisher, Christen & Sabol

[57] ABSTRACT

Disclosed herein are novel multivalent metal-modified salicyclic acid resins useful as color-developing agents for pressure-sensitive copying paper. They can each be produced by causing a salicyclic acid ester and a styrene derivative to undergo a Friedel-Crafts reaction in the presence of a strong acid catalyst, hydrolyzing the resulting salicyclic acid ester resin, and then reacting the thus-obtained salicyclic acid resin with a multivalent metal salt.

7 Claims, 1 Drawing Sheet

PRODUCTION PROCESS OF MULTIVALENT METAL-MODIFIED SALICYLIC ACID/STYRENE RESIN, COLOR-DEVELOPING AGENT USING THE RESIN AND SUITED FOR USE IN PRESSURE-SENSITIVE COPYING PAPER SHEET AND PRESSURE-SENSITIVE COPYING PAPER UNIT EMPLOYING THE AGENT

BACKGROUND OF THE INVENTION (1) Field of the Invention:

This invention relates to novel multivalent metal-modified salicylic acid resins useful as color developing agents for pressure-sensitive copying paper sheets.

(2) Description of the Related Art:

Pressure-sensitive copying paper sheets are also called carbonless copying paper sheets. They produce a color by mechanical or impactive pressure, for example, by writing strokes or typewriter impression, thereby allowing to make a plurality of copies at once. Among such pressure-sensitive copying paper sheets, there are those called "transfer type copying paper sheets", those called "self-contained copying paper sheets", etc. Their color-producing mechanisms are each based on a color-producing reaction between an electron-donating colorless dyestuff precursor and an electron-attracting color-developing agent. Taking a pressure-sensitive copying paper sheet of the transfer type by way of example, it will be described with reference to FIG. 1 which is a schematic cross-sectional view showing the structure of the exemplary pressure-sensitive copying paper sheet.

The back sides of a CB(coating back)-sheet 1 and CF(coating front)/CB-sheet 2 are coated with microcapsules 4 which have diameters of several micrometers to somewhat greater than 10 micrometers and have been obtained by dissolving a colorless pressure-sensitive dyestuff precursor in a non-volatile oil and then encapsulating the resultant pressure-sensitive dyestuff precursor solution with high-molecular films such as gelatin films. On the other hand, the front sides of the CF/CB-sheets 2 and a CF-sheet 3 are coated with a coating formulation containing a color-developing agent 5 which has such properties that upon contact with the pressure-sensitive dyestuff precursor, the color-developing agent 5 undergoes a reaction with the dyestuff precursor, thereby causing the dyestuff precursor to produce its color. In order to make copies, they are stacked in the order of the CB-sheet, (CF/CB-sheet), (CF/CB-sheet) and CF-sheet with the sides coated with the dyestuff precursor maintained in a contiguous relation with the sides coated with the color-developing agent. When a pressure is applied locally by a ballpoint pen 6 or a typewriter, the capsules 4 are ruptured there. As a result, the pressure-sensitive dyestuff precursor solution is transferred to the color-developing agent 5 so that copied records are obtained.

As electron-attracting color-developing agents, there have been proposed (1) inorganic solid acids such as acid clay and attapulgite, as disclosed in U.S. Pat. No. 2,712,507; (2) substituted phenols and diphenols, as disclosed in Japanese Patent Publication No. 9309/1965; (3) p-substituted phenol-formaldehyde polymers, as disclosed in Japanese Patent Publication No. 20144/1967; (4) metal salts of aromatic carboxylic acids, as disclosed in Japanese Patent Publication Nos. 10856/1974 and 1327/1977; etc. Some of them have already been employed actually.

As performance conditions which a sheet coated with a layer of a color-developing agent in the stacked structure of a pressure-sensitive copying paper unit, namely, a color-developing sheet is supposed to satisfy, may be mentioned little yellowing during storage and upon exposure to radiant rays such as sunlight and good fastness of produced color marks so that they do not disappear or fade easily by radiant rays, water or a plasticizer, to say nothing of excellent color-developing ability not only right after its fabrication but also after its storage over a long period of time.

Color-developing agents, which have been proposed to date, and sheets coated with such conventional color-developing agents have both advantages and disadvantages in performance. For example, inorganic solid acids are inexpensive but adsorb gas and moisture in the air during storage. They hence cause yellowing of paper surfaces and reduced color-producing performance. Substituted phenols have insufficient color-producing ability and produced color marks have low color densities. Para-phenylphenol novolak resins which are usually employed as p-substituted phenol-formaldehyde polymers have excellent color-producing ability, but paper sheets coated with them undergo yellowing and produced color marks are faded significantly upon exposure to sunlight or during storage (especially, by nitrogen oxides in the air). In addition, metal salts of aromatic carboxylic acids are good in yellowing resistance but their color-producing ability at low temperatures, resistance to water or plasticizers and light fastness cannot still be considered sufficient.

SUMMARY OF THE INVENTION

An object of this invention is to provide a novel process for a multivalent metal-modified salicylic acid resin useful as a color-developing agent free of the above-mentioned drawbacks. Although metal-modified salicylic acid derivatives are known to have excellent color-developing properties, simple alkyl-substituted salicylic acid compounds out of such derivatives are not satisfactory for practical application. On the other hand, salicylic acid compounds substituted by aromatic groups are still better in various properties. This invention provides a novel process for reacting an aromatic olefin compound into a resin so that properties such as light fastness and water resistance can be improved further.

Another object of this invention is to provide a novel excellent color-developing agent using the multivalent metal-modified salicylic acid resin thus provided and suited for use in pressure-sensitive copying paper sheets.

A further object of this invention is to provide a pressure-sensitive copying paper unit making use of the color-developing agent.

The present inventors have carried out an extensive investigation in order to attain the above-described objects, resulting in the completion of this invention. This invention therefore provides a process for the production of a multivalent metal-modified salicylic acid resin, which comprises reacting a styrene derivative, which is represented by the following general formula (II):

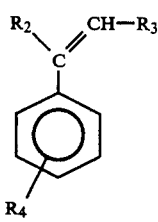

$$\text{(II)}$$

wherein $R_2$ and $R_3$ are independently a hydrogen atom or a methyl group and $R_4$ denotes a hydrogen atom or a $C_{1-4}$ alkyl group, with a salicylic acid ester represented by the following general formula (I):

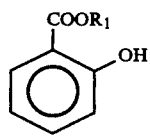

$$\text{(I)}$$

wherein $R_1$ means a hydrogen atom or a $C_{1-12}$ alkyl, aralkyl, aryl or cycloalkyl group, and subsequent to hydrolysis of the salicylic acid ester resin thus obtained, reacting the resultant salicylic acid resin with a multivalent metal salt.

Compared with color-developing sheets making use of an inorganic solid acid or p-phenylphenol novolak resin, a color-developing sheet making use of a novel color-developing agent, which comprises the above multivalent metal-modified salicylic acid resin, has either comparable or superior color-producing ability. In addition, the latter color-developing sheet has also been improved in yellowing tendency upon exposure to sunlight. In particular, its yellowing resistance to nitrogen oxides in the air has been improved significantly, whereby it is extremely advantageous in handling and storage.

Metal salts of salicylic acid compounds have conventionally been known as typical examples of metal salts of aromatic carboxylic acids. They are however known to have the following drawbacks as color-developing agents.

(a) They have insufficient miscibility with a non-volatile oil in which a colorless dyestuff precursor is dissolved.

(b) They are somewhat dissolved in water.

(c) Produced color marks fade out upon exposure to light.

(d) They are costly.

The multivalent metal-modified salicylic acid resin according to this invention can therefore provide at a low cost a useful color-developing agent free of the above-described drawbacks and improved in color-producing ability at low temperatures and the stability of produced color marks to light and water, etc.

The multivalent metal-modified salicylic acid resin according to this invention can be produced by causing a salicylic acid ester and a styrene derivative to undergo a Friedel-Crafts reaction in the presence of a strong acid catalyst (hereinafter called the "first-stage reaction), hydrolyzing the resulting salicylic acid ester resin (hereinafter called the "second-stage reaction), and then reacting the thus-obtained salicylic acid resin with a multivalent metal salt (hereinafter called the "third-stage reaction).

DETAILED DESCRIPTION OF THE INVENTION

Figure 1:
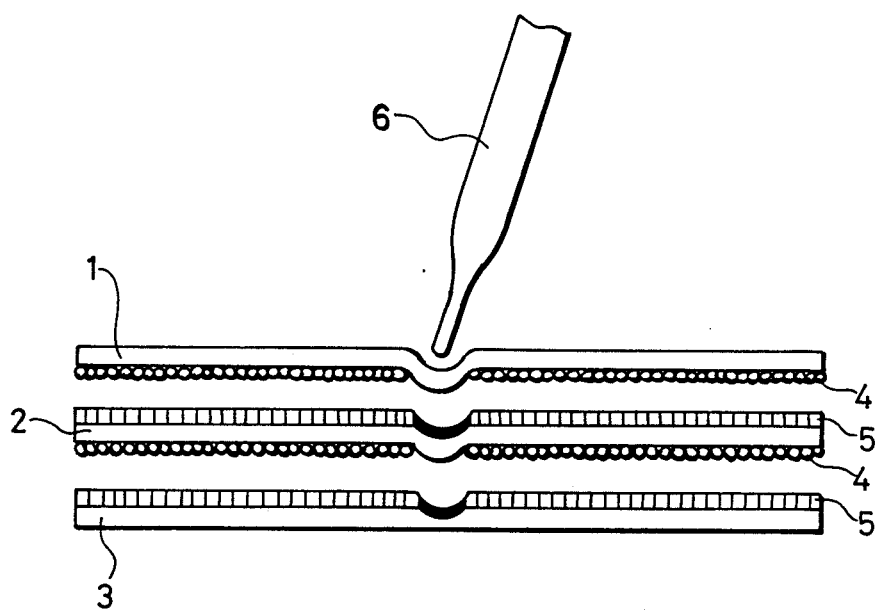
FIG. 1 illustrates the structure of a pressure-sensitive copying paper sheet, in which there are shown a CB-sheet 1, a CF/CB-sheet 2, a CF-sheet 3, microcapsules 4, a color-developing agent 5 and a ballpoint pen 6.

The salicylic acid resins obtained in the first and second stages respectively have heretofore not been disclosed at all and have been found for the first time by the present inventors.

In the first-stage reaction, the styrene derivative represented by the general formula (II) is reacted with the salicylic acid ester represented by the general formula (I) in the presence of the strong acid catalyst, so that the salicylic acid ester resin is obtained.

It has conventionally been practised routinely to obtain alkyl-substituted salicylic acids by alkylating salicylic acid. Several processes have been known. Included in such conventional processes are, for example, to react isobutanol with salicylic acid to obtain tert-butylsalicylic acid ["Jikken Kagaku Koza (Handbook of Experimental Chemistry)", 18, 30 (1956), Maruzen Company Ltd.], to react 2 moles of phenyl ethanol with 1 mole of salicylic acid to obtain 5-[α-methyl-4'-(α-methylbenzyl)-benzyl]-salicylic acid (Japanese Patent Laid-Open Nos. 100493/1986 and 96449/1987, both, in the name of Ciba-Geigy AG).

The present inventors have already found processes for obtaining various co-condensation resins by condensing salicylic acid with a variety of benzyl compounds (Japanese Patent Application Nos. 262019/1986, 18472/1987, 19672/1987 and 6218/1987). All of these processes however involves a reaction between salicylic acid and an alcohol or alkoxy compound. A process for obtaining dibenzyl-substituted salicylic acids of two kinds by a direct reaction between an olefin compound and salicylic acid is disclosed in Japanese Patent Laid-Open No. 84045/1987. Since the reactivity of salicylic acid containing the electron-attracting groups is low, this process makes use of a relatively large amount of an aromatic sulfonic acid compound as a catalyst and conducts the reaction at an elevated temperature, whereby the corresponding aromatic substituted salicylic acid compounds are obtained. Under such severe conditions, the styrene derivative employed tends to undergo polymerization and difficulties are involved in the control of reaction heat. Dibenzyl salicylates of only two kinds are obtained as the aromatic substituted salicylic compounds in the above reaction. This is attributed to the low reactivity of salicylic acid. However these dibenzyl salicylates of two kinds still involve the above-mentioned drawbacks when used as color-developing agents. The present inventors have however found surprisingly that in spite of the above-mentioned low reactivity of salicylic acid, a styrene derivative easily reacts to the benzene ring of a salicylic acid ester upon their reaction.

Namely, the present inventors have found that when a salicylic acid ester and a styrene derivative are subjected to a successive reaction in the presence of a strong acid catalyst, the α-position of the styrene derivative reacts to the salicylic acid skeleton at both positions ortho and/or para to the hydroxyl group of the salicylic acid skeleton and excess styrene derivative reacts to the benzene ring of the styrene derivative bound to the salicylic acid skeleton, thereby leading to an increased molecular weight. As a result, a novel and useful resin of the salicylic acid ester is obtained. As illustrative examples of the salicylic acid ester employed in the first-stage reaction, may be mentioned methyl salicylate, ethyl salicylate, n-propyl salicylate, isopropyl salicylate, n-butyl salicylate, isobutyl salicylate, tert-butyl salicylate, isoamyl salicylate, tert-octyl salicylate, nonyl salicylate, dodecyl salicylate, cyclohexyl salicylate, phenyl salicylate, benzyl salicylate, α-methylbenzyl salicylate, and so on. It should however be borne in mind that the present invention is not necessarily limited to the use of these exemplified salicylic acid esters. Economical methyl salicylate is preferred from the industrial viewpoint.

As illustrative examples of the styrene derivative defined by the general formula (II) and used in the above reaction, may be mentioned styrene, o-methylstyrene, m-methylstyrene, p-methylstyrene, o-ethylstyrene, p-ethylstyrene, o-isopropylstyrene, m-isopropylstyrene, p-isopropylstyrene, p-tert-butylstyrene, α-methylstyrene, β-methylstyrene and so on. It should however be borne in mind that the present invention is not necessarily limited to the use of the above exemplified specific styrene derivatives. From the industrial standpoint, styrene is preferred for its economical price.

The styrene derivative may be used in an amount of 1-20 moles, preferably, 2-10 moles per mole of the salicylic acid ester. If the styrene derivative is used in an amount smaller than the lower limit specified in the present invention, the compatibility with a non-volatile oil in microcapsules on a CB-sheet and the water insolubility are impaired to a certain extent. On the other hand, an amount greater than the upper limit results in a decrease to the relative proportion of salicylic acid and the density of a color to be produced will not reach a desired level. The weight average molecular weight of a salicylic acid ester resin produced by using the styrene derivative within the above-specified range falls within a range of 500–10,000.

In this first-stage reaction, a strong acid catalyst is used.

Usable strong acid catalysts may include, for example, mineral acids such as hydrochloric acid, sulfuric acid and phosphoric acid, Friedel-Crafts catalysts such as ferric chloride, zinc chloride, aluminum chloride, stannic chloride, titanium tetrachloride and boron trifluoride, methanesulfonic acid, trifluoromethanesulfonic acid, etc. Of these, sulfuric acid is particularly preferred for its economical price. The catalyst may be used in an amount of 0.05–200 wt.% based on the total weight of the salicylic acid ester and styrene derivative, with 1–50 wt.% being preferable from the economical standpoint.

Further, a solvent may also be used in the first-stage reaction. Illustrative examples of the solvent may include those inert to the reaction, for example, aliphatic hydrocarbons such as n-hexane, n-heptane, n-pentane and cyclohexane; ethers such as ethyl ether and ethylene glycol dimethyl ether; esters such as ethyl acetate and butyl acetate; halogenated hydrocarbon solvents such as methylene chloride, 1,2-tetradichloroethane, 1,1,2-trichloroethane, carbon tetrachloride, chloroform and monochlorobenzene; organic acids such as acetic acid and propionic acid; ketones such as acetone and methyl ethyl ketone; and in addition, benzene, carbon disulfide, nitromethane, acetonitrile, tetrahydrofuran and the like.

In view of economy, it is desirable to use such a solvent in an amount not more than 30 times by volume/weight the total weight of the starting materials.

The reaction temperature upon practice of the first-stage reaction may range from −20° C. to +180° C., preferably, from 0° C. to +120° C. The reaction time may be in a range of 1−+ hours.

The first-stage reaction is generally carried out by incorporating the catalyst into the salicylic acid ester or its organic solvent solution and then reacting the salicylic acid ester with the other starting material, namely, the styrene derivative at a predetermined temperature while adding the latter dropwise. Here, the time of the dropwise addition may preferably account for at least 50% of the whole reaction time and may usually range from 1 to 20 hours. When the solvent used is insoluble in water, water may be added to the reaction mixture after the reaction. After washing the reaction mixture with the water and allowing the resultant mixture to separate into two layers, the solvent may be distilled off to obtain the resin. Where the solvent is soluble in water, the reaction mixture may be poured into water and the resin may then be obtained as a precipitate.

The hydrolysis (second-stage reaction) of the salicylic acid ester resin obtained by the first-stage reaction may be conducted using an ordinary acid or aqueous alkali solution. Namely, acidolysis may generally be practised using water and a mineral acid such as hydrochloric acid or sulfuric acid, both a mineral acid and an organic acid, such as sulfuric acid and acetic acid, an organic sulfonic acid such as benzenesulfonic acid, p-toluenesulfonic acid, chlorobenzenesulfonic acid or methanesulfonic acid, a Lewis acid such as aluminum chloride, zinc chloride or stannic chloride, or an ultrastrong acid such as trifluoromethanesulfonic acid or "Nafion H" (trade name; product of E.I. du Pont de Nemours & Co., Inc.). Alkali hydrolysis may generally be carried out using caustic soda or potash and water.

Upon practice of the hydrolysis with such an acid or alkali, the ratio of the acid or alkali to water may be chosen as desired but may generally range from 1:100 to 99:1, preferably, 5:95 to 95:5 by weight.

Regarding the proportion of an acid or alkali to be used relative to the salicylic acid ester resin obtained in the first-stage reaction, any desired proportion may be chosen in the case of the acid but its proportion may usually be chosen from a range of 0.05−+ times by mole depending on the strength of the acid. In the case of the alkali, its proportion may be within a range from the equivalent amount to 30 times by mole relative to the salicylic ester as the starting material.

The reaction temperature may range from 50–200° C. with 80–160 C. being preferred. When the reaction is carried out at an elevated temperature, it is performed under a naturally-occurring pressure in an autoclave. The pressure ranges from 1 to 30 atm. The reaction time ranges from 1 to 50 hours. A phase transfer catalyst such as a quaternary ammonium salt, quaternary phosphonium salt, crown ether, cryptate or polyethylene glycol may be added as a reaction accelerator in order to shorten the reaction time.

Although this reaction is generally carried out without any solvent, a solvent may be used. Illustrative examples of the solvent may include aprotic polar solvents such as N-methylformamide, N,N-dimethylformamide, N,N-dimethylacetamide, dimethylsulfoxide, sulforan, 1,3-dimethyl-2imidazolidinone, N-methylpyrrolidone and hexamethylphosphotriamide as well as glycols such as ethylene glycol, polyethylene glycol dialkyl ether, 2-methoxyethanol and 2-ethoxyethanol. In addition, water-immiscible solvents such as toluene, xylene, monochlorobenzene, 1,2-dichloroethane and 1,1,2-trichloroethane may also be used. If the solvent is used, an amount of 0.5–10 times by volume/weight is sufficient based on the starting material.

After the reaction, the intended product can be obtained from the reaction mixture by a conventional method. Namely, the hydrolyzate of the salicylic acid ester resin, i.e., the salicylic acid resin can be obtained by a technique such as liquid separation, dilution or concentration.

Several known processes may each be applied to produce a multivalent metal-modified product from the salicylic acid resin thus produced. For example, it may be produced by reacting an alkali metal salt of the salicylic acid resin and a water-soluble multivalent metal in water or a solvent in which the alkali metal salt and water-soluble multivalent metal can be both dissolved. Namely, the water-soluble multivalent metal salt can be formed by reacting a hydroxide, a carbonate or an alkoxide of an alkali metal with the resin to obtain an aqueous solution, alcohol solution or water-alcohol mixed solution of the alkali metal salt of the resin and then reacting it with a water-soluble multivalent metal salt. It is desirable to react about 0.5–'gram equivalent of the water-soluble multivalent metal salt per mole of salicylic acid. The multivalent metal-modified salicylic acid resin can also be produced by mixing the salicylic acid resin with a multivalent metal salt of an organic carboxylic acid such as formic acid, acetic acid, propionic acid, valeric acid, caproic acid, stearic acid or benzoic acid and then heating the resultant mixture into a molten state. In some instances, a basic substance, e.g., ammonium carbonate, ammonium bicarbonate, ammonium acetate or ammonium benzoate may be added further, followed by heating and reaction of the resultant mixture in a molten state.

The metal-modified salicylic acid resin can also be produced by heating, melting and reacting the salicylic acid resin and the carbonate, oxide or hydroxide of a multivalent metal with a basic substance such as the ammonium salt of an organic carboxylic acid, e.g., ammonium formate, ammonium acetate, ammonium caproate, ammonium stearate, ammonium benzoate or the like, and then cooling the reaction product.

When the metal-modified salicylic acid resin is produced by heating and melting the reactants, the melting is conducted at 100–180° C., and the reaction time is about one to several hours although it varies depending on the composition of the resin, the melting temperature and the kind and amount of the multivalent metal salt used. Further, the multivalent metal salt may desirably be used as an organic carboxylic acid salt thereof or the carbonate, oxide and/or hydroxide thereof in an amount such that the multivalent metal is contained in an amount of 0.5–1gram equivalent per mole of salicylic acid.

Although no specific limitation is imposed on the amount of the basic substance to be used, it may generally be used in an amount of 1–15 wt.% based on the total weight of the resin. When the basic substance is used, it is more preferable to use it after mixing the same with the multivalent metal salt in advance.

The softening points (as measured by the ring and ball softening point measuring method prescribed in JIS K-2548) of the metal-modified salicylic acid resins produced by the heating and melting method fall within a range of 50–120° C.

Exemplary metals of the metal-modified salicylic acid resins useful in the present invention may embrace metals other than alkali metals such as lithium, sodium and potassium. As preferable multivalent metals, may be mentioned calcium, magnesium, aluminum, copper, zinc, tin, barium, cobalt, nickel and the like. Among these, zinc is particularly effective.

The multivalent metal-modified salicylic acid resin obtained by the process described above have excellent properties as a color-developing agent. In order to use the metal-modified resin as a color-developing agent, it is preferable to grind it to a suitable particle size in a sand grinding mill or the like. For actual application, it is only necessary to convert it into a desired form by suspending or dissolving the color-developing agent in a solvent. The color-developing agent of this invention may be used in combination with one or more of known color-developing agents, namely, inorganic solid acids such as activated clay, organic polymers such as phenolformaldehyde resin and metal salts of aromatic carboxylic acids without any problems or inconvenience.

The color-developing agent of this invention may also be used in combination with at least one of the oxide, hydroxide and carbonate of a multivalent metal selected from the group consisting of zinc, magnesium, aluminum, lead, titanium, calcium, cobalt, nickel, manganese and barium.

As a method for the fabrication of the color-developing sheet of this invention suitable for use in pressure-sensitive copying paper, any one of the following methods can be employed: (1) to prepare a water-base coating formulation by using an aqueous suspension of the metal-modified product and then to coat a base material such as a paper web with the water-base coating formulation; (2) to incorporate the metal-modified product in a base paper web when the base paper web is produced; and (3) to prepare a coating formulation by using a solution or suspension of the metal-modified product dissolved in an organic solvent and then to coat a base material with the coating formulation.

In order to form a color-developing agent layer on a base material such as paper by a coating method, the color-developing agent may desirably have suitable viscosity and coating applicability. As described above under (1) or (2), the color developing agent may be converted into an aqueous suspension or may be dissolved or suspended in an organic solvent. Thereafter, kaolin clay or its analogous clay, calcium carbonate, starch, synthetic or natural latex, etc. are added to obtain the coating formulation with suitable viscosity and coating applicability. The proportion of color-developing agent in the coating formulation may preferably be 10–70% of the whole solids. If the proportion of color-developing agent is smaller than 10%, it is impossible to exhibit sufficient color-producing ability. Any proportions greater than 70% result in color-developing sheets having poor paper surface characteristics. The coating formulation may be applied at a rate of 0.5 g/m$^2$ or more, preferably, 1– g/m$^2$ in terms of dry weight.

The novel multivalent metal-modified salicylic acid resin obtained by the present invention is superb as a color-developing agent, and compared with metal salts of salicylic acid compounds typical as metal salts of aromatic carboxylic acids, it has been improved significantly in the color-producing ability at low temperatures, the stability to light and the resistance to water. In addition, it is extremely advantageous as it can be produced by simple steps with inexpensive starting materials. Upon preparing a coating formulation from the color-developing agent according to this invention and coating a base material for a color-developing sheet with a color-developing layer, it is sufficient to use the color-developing agent and coating formulation in a relatively small amount. In addition, the concentration, viscosity, etc. of the coating formulation can be varied over relatively wide ranges. Both on-machine and off-machine coating operations are hence feasible, whereby a great merit has been brought about from the standpoint of fabrication steps for pressure-sensitive copying paper.

Compared with color-developing sheets using an inorganic solid acid or p-phenylphenol novolak resin, color-developing sheets making use of the color-developing agent according to this invention and suited for pressure-sensitive copying paper have either comparable or better color-producing ability. In addition, the yellowing tendency upon exposure to sunlight has also been improved. In particular, resistance to the yellowing by nitrogen oxides in the air has been improved to a significant extent. They are hence extremely advantageous in both handling and storage.

The color-developing sheets of this invention are substantially free from yellowing by light and gases in the air such as nitrogen oxides. Produced color marks are stable to light, plasticizers and the like and are not substantially lowered in color density. They have good waterproofness. Therefore the present invention makes it possible to broaden the utility of pressure-sensitive copying paper to such fields that conventional color-developing sheets are not suited owing to the incapability for meeting the requirement for long-term storage stability. Accordingly, this invention has extremely great practical significance.

Namely, the pressure-sensitive copying paper unit having the structure that the color-developing sheet coated with the electron-attracting color-developing agent of this invention and a sheet coated with an electron-donating colorless dyestuff precursor are stacked with their coated sides facing each other has excellent color-producing ability, yellowing resistance, and other desirable properties.

EXAMPLES

The present invention will hereinafter be described in further detail by the following Examples.

The following methods were relied upon for the determination of performance of color-developing sheets for pressure-sensitive copying paper, which were fabricated using the products as color-developing agents obtained respectively in the following Examples and Comparative Examples. The results are shown collectively in Table 1.

1. Fabrication of color-developing sheets

Suspensions of the following composition were separately prepared by using multivalent metal-modified salicylic acid resins obtained respectively in Examples 1–7 and the compounds of Comparative Examples 1 and 2, which will be described subsequently, as color-developing agents and dispersing them in a sand grinding mill.

|  | Parts by weight |
|---|---|
| Color-developing agent | 6 |
| 10% Aqueous solution of polyvinyl alcohol ("Kuraray #117", trade name; product of Kuraray Co., Ltd.) | 3 |
| Water | 22.5 |

Next, coating formulations of the following composition were prepared using the suspensions respectively.

|  | Parts by weight |
|---|---|
| Suspension | 10 |
| Synthetic calcium carbonate | 10 |
| Starch | 0.8 |
| Synthetic rubber latex | 0.8 |
| Water | 32.5 |

Those coating formulations were separately applied on high-quality paper webs to give a dry coat weight of 5.014 5.5 g/m², thereby obtaining color-developing sheets.

2. Color-producing speed and produced color density (conducted in an air-conditioned room of 5° C., 60% R.H. and 20° C., 65% R.H.)

Using a commercial blue-color producing CB-sheet containing Crystal Violet Lactone (CVL) as a principal pressure-sensitive dyestuff precursor ("NW-40T", trade name; produce of Jujo Paper Co., Ltd.), a sample color-developing sheet (CF-sheet) coated with a water-base coating formulation was stacked with their coated sides maintained in a contiguous relation. The thus-stacked pressure-sensitive copying paper was typed by an electronic typewriter to produce a color.

The color of the sample color-developing sheet was measured twice, namely, 1 minute and 30 seconds after the typing and 24 hours after the typing. The results are expressed in terms of Y value.

3. Light fastness of produced color marks

Each sample color-developing sheet, which had produced a color in the manner described above in the testing method 2, was exposed for 2 hours (and for 4 hours) to light on a carbon arc fadeometer (manufactured by Suga Testing Machine Co., Ltd.). After the exposure, its reflectance was measured by the "Z-80 Color Difference Meter". The results are expressed in terms of Y-value.

The smaller the Y value and the smaller its difference from the Y value before the test, the less the fading by the light and the more preferable resistance:

4. Plasticizer resistance

DOP microcapsule coated paper sheets were prepared by forming microcapsules, which contained dioctyl phthalate (DOP) as a core substance, had an average capsule size of 5.0 μm, and were equipped with melamine-formaldehyde resin capsule walls, adding a small amount of a starch-type binder, applying the thus-prepared coating formulation by an air-knife coater on a high-quality paper web to achieve a dry coat weight of 5 g/m² and then drying the thus-coated paper web. One of the DOP microcapsule coated paper sheets and the color-developing sheet with color marks produced above in the testing method 1 were brought into a contiguous relation with their coated sides facing each other. They were thereafter caused to pass under a linear pressure of 100 Kg/cm through a super calender roll, so that DOP was allowed to penetrate uniformly into the colored surface.

One hour after the test, the reflectance of the color-developing sheet was measured by the "Z-80 Color Difference Meter". The results are expressed in terms of Y value. The smaller the Y value and the smaller its difference from the Y value before the test, the better the plasticizer resistance of the produced color marks.

5 Waterproofness of produced color marks

Each sample color-developing sheet, which had been colored by the testing method 2, was dipped for 2 hours in water. Density changes of the produced color marks were observed visually.

6. Yellowing tendency of color-developing sheets (6–1) Yellowing by $NO_x$

Following JIS L-1055 (Testing Method for $NO_x$ Gas Fastness of Dyed Materials and Dyes), each sample color-developing sheet was stored for 1 hour in a closed vessel of an atmosphere of $NO_x$ occurred by the reaction of $NaNO_2$ (sodium sulfite) and $H_3PO_4$ (phosphoric acid). The degree of its yellowing was investigated.

Upon an elapsed time of 1 hour after completion of the storage, the reflectance of the color-developing sheet was measured by the "Σ-80 Color Difference Meter". The measurement results are expressed in terms of WB value. The greater the WB value and the smaller its difference from the WB value of unexposed color-developing sheets of the same type, the smaller the yellowing tendency in an $NO_x$ atmosphere.

(6–2) Yellowing by light

Each sample color-developing sheet was exposed for 4 hours to light on the carbon arc fadeometer (manufactured by Suga Testing Machine Co., Ltd.). After the exposure, the reflectance of the sample color-developing sheet was measured by the "Σ-80 Color Difference Meter". The measurement results are expressed in terms of WB value. The greater the WB value and the smaller its difference from the WB value of unexposed color-developing sheets of the same type, the smaller the yellowing tendency upon exposure to light.

EXAMPLE 1

Charged in a glass-made reactor were 15.2 g (0.1 mole) of methyl salicylate, 50 ml of 1,2-dichloroethane, and 3.75 g of 96% concentrated sulfuric acid. Under vigorous stirring, 52 g (0.5 mole) of styrene was added dropwise at 0–2° C. over 6 hours. Thereafter, aging was conducted for 3 hours at the same temperature to complete the reaction. Fifty grams of a 85% aqueous solution of sulfuric acid were then added to the reaction mixture and the resulting mixture was heated to distill out 1,2-dichloroethane. The residue was added with 50 ml of acetic acid, followed by hydrolysis under reflux for 18 hours. After completion of the hydrolysis, the reaction mixture was poured into 300 ml of water. When left over, a brown resin precipitated. The aqueous mixture was then decanted to get rid of the upper water layer. The precipitate was thereafter washed twice with 300 ml of warm water.

The weight average molecular weight of the thus-obtained salicylic acid resin was 960. The resin was placed in a separate reactor, to which a mixture of 16.3 g of zinc benzoate and 10 g of ammonium bicarbonate, which had been prepared in advance at 150–160° C, was added little by little over 30 minutes. After the addition, stirring was continued at the same temperature for 1 hour. The contents were taken out of the reactor, cooled and then ground, thereby obtaining 79.5 g of a zinc-benzoate-modified product of the salicylic acid resin. Its softening point was measured by the ring and ball softening point measuring apparatus in accordance with JIS K-2548. It was found to be 82° C.

EXAMPLE 2

Charged in a glass-made reactor were 22.8 g (0.1 mole) of benzyl salicylate, 75 ml of methylene chloride, and 15.9 g of 96% concentrated sulfuric acid. At 5–12° C, 83.2 (0.8 mole) of styrene was added dropwise over 8.5 hours to react the benzyl salicylate and styrene each other. After aging the reaction mixture for 3 hours at the same temperature, it was neutralized with dilute aqueous ammonia to obtain a methylene chloride solution of a salicylic acid ester resin. The weight average molecular weight of the resin was 1380. The solution was thereafter heated to 120° C. while distilling out the solvent. To the somewhat viscous solution of the salicylic acid ester resin, 35 g (0.05 mole) of a 20% aqueous solution of zinc chloride was added dropwise, followed by stirring under reflux for 12 hours. The reaction mixture was then heated to 140° C. After stirring it at that temperature for 2 hours, 250 m; of toluene was added.

While maintaining the temperature at 70–80° C, 7.3 g (0.12 mole) of 28% aqueous ammonia was added dropwise, followed by stirring for 1 hour. The reaction mixture was thereafter left over. After removing a water layer separated out as a lower layer, the toluene solution was heated to distill out the toluene. A reddish brown resin solution was taken out and after cooling, was ground to obtain 93.5 g of a zinc-modified product of the salicylic acid resin. Its softening point was 6° C.

EXAMPLE 3

Using 38.4 g (0.3 mole) of p-methylstyrene instead of styrene in the first-stage reaction of Example 1, a similar reaction was conducted. Then, 80 g (0.2 mole) of a 10% aqueous solution of caustic soda was added. The resulting mixture was heated to distill out the solvent. Hydrolysis was then conducted at 100–102° C. for 12 hours. The reaction mixture was a somewhat clouded solution. After diluting the reaction mixture with 850 ml of water, 400 g (0.07 mole) of a 5% aqueous solution of zinc sulfate was added dropwise at 20–25° C. for 3 hours. A precipitate thus crystallized out was collected by filtration, washed with water and then dried in vacuo, thereby obtaining 52 g of a zinc-modified salicylic acid resin of a white color. Its softening point was 112° C.

EXAMPLE 4

A reaction was conducted in a similar manner as in Example 1 except that α-methylstyrene was used in place of styrene, so that a salicylic acid resin having a weight average molecular weight of 720 was obtained. The resin was added with 4.1 g (0.05 mole) of zinc oxide. Upon their reaction at 140–150° C. for 2 hours, 76 g of a transparent zinc-modified salicylic acid resin having a reddish brown color was obtained. Its softening point was 71° C.

EXAMPLE 5

Charged in a glass-made reactor were 15.2 g (0.1 mole) of methyl salicylate, 50 ml of 1,2-dichloroethane, and 3.75 g of 96% concentrated sulfuric acid. Under vigorous stirring, 83.2 g (0.8 mole) of styrene was added dropwise at 0–5° C. over 12 hours. Thereafter, aging was conducted for 3 hours at the same temperature to complete a first-stage reaction.

Then, 15 ml of water was added to the reaction mixture. The resultant mixture was heated to 104° C. so that the solvent, 1,2-dichloroethane, was distilled out. Eighteen grams of a 45% aqueous solution of caustic soda were added dropwise, followed by a second-stage reaction at 95–100° C. for 2 hours.

After completion of the second-stage reaction, the reaction mixture was cooled to 80° C. and 150 ml of toluene was added to the same. The resultant mixture was then neutralized to pH 6 with a 10% aqueous solution of sulfuric acid and a water layer separated out as a lower layer was removed. A 20% saline solution (60 g) was added to the toluene solution and the resultant mixture was stirred to wash the toluene solution. A lower layer was then separated out. Magnesium oxide (2 g) was added to the thus-obtained toluene solution of salicylic acid resin. The toluene solution was then heated to conduct a third-stage reaction while distilling out the toluene. The residue was finally maintained at 145–150° C. for 30 minutes under a vacuum of aspirator and then discharged onto a porcelain plate, thereby a transparent magnesium-modified salicylic acid resin of a reddish brown color was obtained (yield: 94.3 g). Its softening point and average molecular weight were 95° C and 1150 respectively.

EXAMPLE 6

The procedure of Example 5 was repeated except that 2 g of zinc oxide and 6.2 of nickel acetate tetrahydrate were used in lieu of the magnesium oxide in the third-stage reaction, whereby a zinc.nickel-modified salicylic acid resin was obtained (yield: 96.5 g). Its softening point and average molecular weight were 105° C. and 1350 respectively.

EXAMPLE 7

Charged in a glass-made reactor were 20.4 g (0.1 mole) of isobutyl salicylate, 25 ml of acetic acid and 1.5 g of trifluoromethanesulfonic acid as a catalyst, followed by a dropwise addition of 52 g (0.5 mole) of styrene at 25–35° C. over 5 hours. Aging was then conducted for 3 hours at the same temperature, so that a first-stage reaction was completed.

The reaction mixture was then transferred to an autoclave. After adding 10 g of water, the resultant mixture was heated. Hydrolysis was conducted at 150–160° C. and 3–5 atm for 15 hours, thereby completing a second-stage reaction.

The reaction mixture was cooled. When diluted with 300 ml of water, a brown viscous resinous material precipitated. It was separated and placed in a glass-made reactor. Eight grams of zinc hydroxide were added and the temperature was raised to 145° C. Volatile components were removed in vacuo for 30 minutes, there-by completing a third-stage reaction. A zinc-modified salicylic acid resin was obtained in a yield of 45.8 g. Its softening point and average molecular weight were 68° C. and 580 respectively.

COMPARATIVE EXAMPLE 1

Charged in a glass-made reactor were 170 g of p-phenylphenol, 22.5 g of 80% para-formaldehyde, 2.0 g of p-toluenesulfonic acid and 200 g of benzene. The contents were heated under stirring and while distilling out the resulting water as an azeotropic mixture with benzene from the reaction system, they were reacted at 70–80° C. for 2 hours. After the reaction, 320 g of a 10% aqueous solution of sodium hydroxide was added and benzene was distilled out by steam distillation. The reaction mixture was then cooled, followed by dropwise addition of dilute sulfuric acid. A p-phenylphenol-formaldehyde polymer thus precipitated was collected by filtration, washed with water and then dried, thereby obtaining 176 g of white powder.

COMPARATIVE EXAMPLE 2

Charged in a reactor equipped with a thermometer, reflux condenser, dropping funnel and stirrer were 9.4 g of phenol and 0.2 g of sulfuric acid. Then, 23.6 g of α-methylstyrene was added dropwise under stirring at 50° C. over 5 hours from a dropping funnel. After completion of the dropwise addition, the reaction mixture was aged for 5 hours and then poured into a dilute aqueous solution of sodium carbonate. The resultant mixture was separated to obtain an oil layer. The oil layer was then distilled in vacuo. At a vacuum level of 3–4 mmHg, 22 g of a fraction having a boiling point of at least 220° C. was obtained. Thereafter, 7.5 g of a 40% aqueous solution of caustic soda was added to the fraction, followed by dehydration under reflux of xylene. After the dehydration, the xylene mixture was transferred to an autoclave and carbon dioxide was then charged to 30 kg/cm² at 160° C. The contents were then reacted for 5 hours at the same temperature. After the reaction, the autoclave was cooled, the remaining gas was purged, the reaction mixture was extracted with hot water and the extract was neutralized with dilute sulfuric acid. As a result, crystals were caused to precipitate. Those crystals were then collected by filtration, followed by recrystallization using an aqueous acetic acid solution to obtain 8 g of 3,5-di(α,α-dimethylbenzyl)salicylic acid. A zinc salt was produced from the salicylic acid compound in the same manner as in Example 2.

TABLE 1

| | PERFORMANCE TEST RESULTS OF COLOR-DEVELOPING SHEETS | | | | |
|---|---|---|---|---|---|
| | | | | Blue color production (20° C., 65% HR) | |
| | WB value of | NOx yellowing resistance of | Light yellowing resistance of | Color density produced by color-developing sheet (Y) | |
| Ex. | untested sheet | color-developing sheet (WB value) | color-developing sheet (WB value) | 1.5 minutes later | 24 hours later |
| 1 | 84.7 | 82.4 (2.3) | 82.8 (1.9) | 57.8 | 54.2 |
| 2 | 85.6 | 82.8 (2.8) | 83.4 (2.2) | 56.0 | 54.2 |
| 3 | 84.2 | 82.0 (2.2) | 81.8 (2.4) | 57.5 | 55.0 |
| 4 | 84.9 | 82.3 (2.6) | 83.0 (1.9) | 56.8 | 54.5 |
| 5 | 84.4 | 82.0 (2.4) | 78.6 (5.8) | 56.0 | 53.2 |
| 6 | 85.8 | 82.5 (3.3) | 83.7 (2.1) | 57.6 | 54.9 |

TABLE 1-continued

| | | | | | |
|---|---|---|---|---|---|
| 7 | 83.9 | 81.1 (2.8) | 81.8 (2.1) | 55.4 | 54.5 |
| Comp. Ex. 1 | 83.9 | 57.2 (26.7) | 71.9 (12.0) | 61.9 | 56.9 |
| Comp. Ex. 2 | 84.3 | 80.0 (4.3) | 81.0 (3.3) | 59.3 | 55.2 |

| | Blue color production (20° C., 65% HR) | | | Low-temp. color production (5° C., 60% RH) | |
|---|---|---|---|---|---|
| | Light fastness of produced color marks (Y) | Plasticizer resistance of produced color marks | Water resistance of produced color marks | Color density produced by color-developing sheet (Y) | |
| Ex. | 2 hours / 4 hours | (Y) | (Y) | 1.5 minutes later | 24 hours later |
| 1 | 61.2  69.8 | 55.1 | Good | 60.3 | 54.9 |
| 2 | 60.8  67.5 | 54.9 | Good | 58.2 | 54.5 |
| 3 | 62.2  71.1 | 54.8 | Good | 61.8 | 55.5 |
| 4 | 61.3  69.5 | 54.8 | Good | 60.1 | 54.7 |
| 5 | 67.2  75.1 | 53.5 | Good | 59.5 | 54.5 |
| 6 | 57.5  62.5 | 54.1 | Good | 62.4 | 54.9 |
| 7 | 63.2  69.4 | 54.1 | Good | 57.8 | 55.2 |
| Comp. Ex. 1 | 67.6  77.1 | 55.8 | Good | 65.4 | 57.8 |
| Comp. Ex. 2 | 63.2  72.9 | 59.6 | Faded out | 70.5 | 57.6 |

*Values in parentheses are each a difference between the WB value of an untested sheet and that of the same sheet after testing.

We claim:

1. A process for the production of a multi-valent metal-modified salicylic acid resin, which comprises reacting a styrene derivative, which is represented by the following general formula (II):

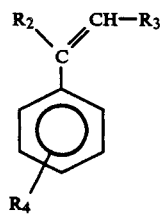

(II)

wherein $R_2$ and $R_3$ are independently a hydrogen atom or a methyl group and $R_4$ denotes a hydrogen atom or a $C_{1-4}$ alkyl group, with a salicylic acid ester represented by the following general formula (I):

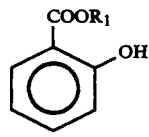

(I)

wherein $R_1$ is a $C_{1-12}$ alkyl, aralkyl, aryl or cycloalkyl group, and subsequent to hydrolysis of the salicylic acid ester resin thus obtained, reacting the resultant salicylic acid resin with a multivalent metal salt.

2. The process as claimed in claim 1, wherein the styrene derivative is reacted in a molar ratio of 1–20 relative to the salicylic acid ester.

3. The process as claimed in claim 1, wherein the reaction between the salicylic acid ester and styrene derivative is conducted at −20° C. to +180° C. in the presence of a strong acid catalyst in an amount of 0.05–200 wt.% based on the sum of the weights of the salicylic acid ester and styrene derivative.

4. The process as claimed in claim 1, wherein the hydrolysis is conducted at an acid or alkali/water weight ratio of 1/100–99/1 and a reaction temperature of 50°–200° C.

5. The process as claimed in claim 1, wherein the metal in the multivalent metal salt is comprised of at least one metal selected the group consisting of calcium, magnesium, aluminum, copper, zinc, tin, barium, cobalt and nickel.

6. The process as claimed in claim 1, wherein the multivalent metal salt is reacted in the form of an organic carboxylic acid salt, carbonic acid salt, oxide and/or hydroxide in such an amount that the metal is contained in a proportion of 0.5–1 gram equivalent per mole of salicylic acid.

7. A color-developing agent suited for use in a pressure-sensitive copying paper sheet, which comprises the multivalent metal-modified salicylic acid resin according to claim 1.

* * * * *